W. V. DEAHL.
STORM FRONT FOR VEHICLES.
APPLICATION FILED APR. 29, 1910.
1,000,241.
Patented Aug. 8, 1911.
3 SHEETS—SHEET 1.
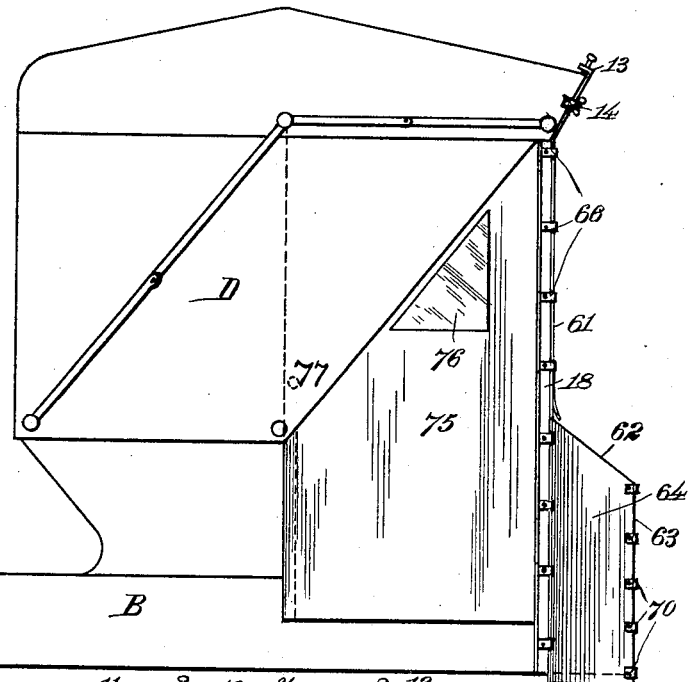
Fig. 1.
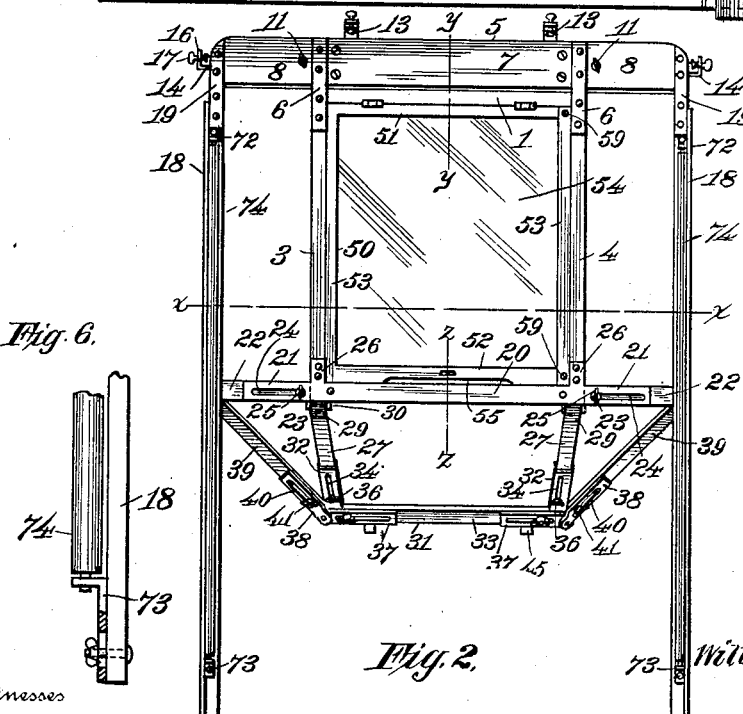
Fig. 6.
Fig. 2.
Witnesses
Inventor
William V. Deahl
By Joshua R. H. Potts
Attorney

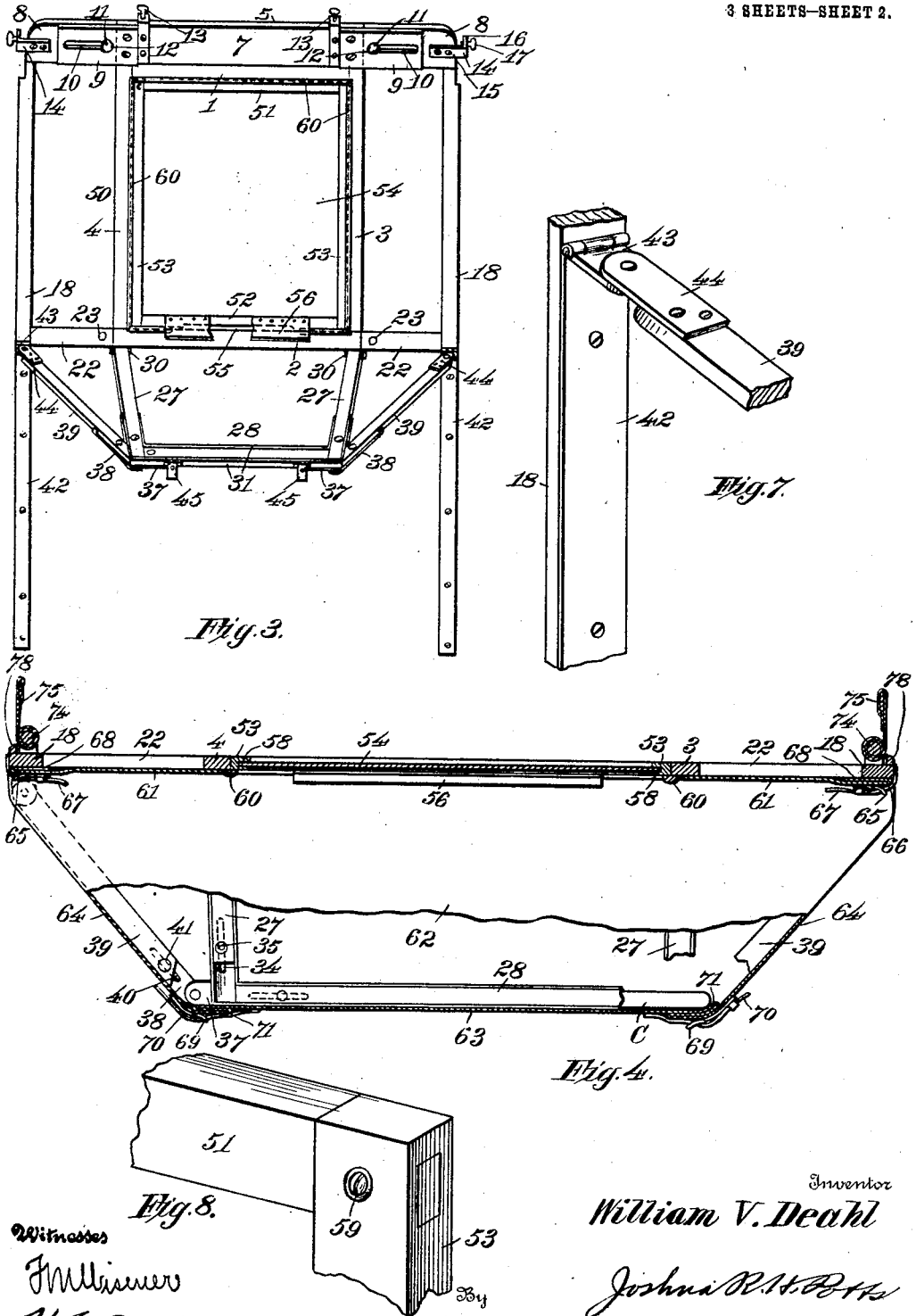

W. V. DEAHL.
STORM FRONT FOR VEHICLES.
APPLICATION FILED APR. 29, 1910.
1,000,241.
Patented Aug. 8, 1911.
3 SHEETS—SHEET 3.
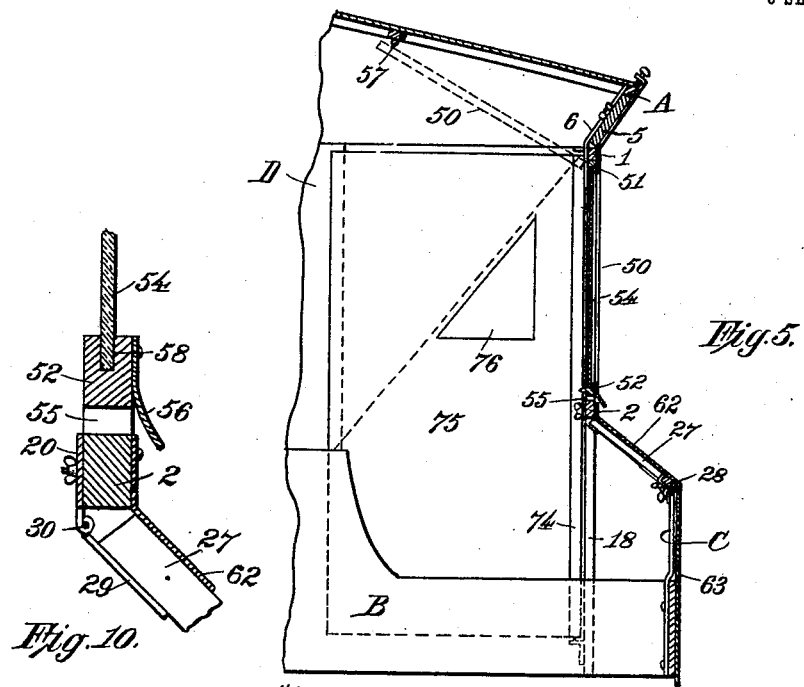
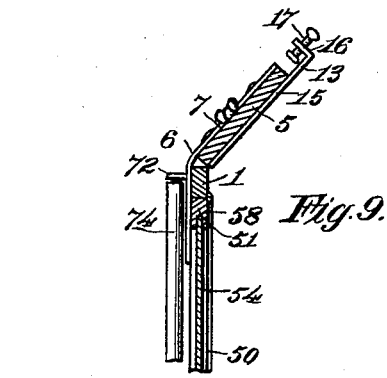
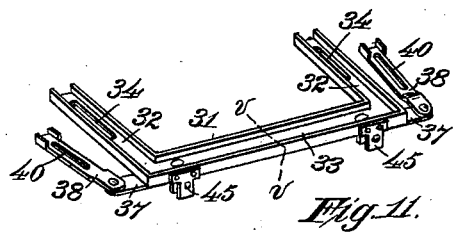
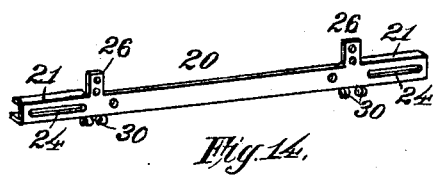
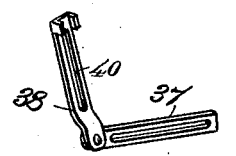
Witnesses
Inventor
William V. Deahl
By Joshua R. H. Potts
Attorney

UNITED STATES PATENT OFFICE.

WILLIAM V. DEAHL, OF MARTINSVILLE, ILLINOIS.

STORM-FRONT FOR VEHICLES.

1,000,241. Specification of Letters Patent. Patented Aug. 8, 1911.

Application filed April 29, 1910. Serial No. 558,415.

*To all whom it may concern:*

Be it known that I, WILLIAM V. DEAHL, a citizen of the United States, residing at Martinsville, county of Clark, and State of Illinois, have invented certain new and useful Improvements in Storm-Fronts for Vehicles, of which the following is a specification.

My invention relates to storm fronts for vehicles such as buggies carriages and the like.

The object of my invention is to provide a storm front for a vehicle as mentioned which may be readily adjusted to fit vehicles of various dimensions and which may be readily and quickly secured thereto and as easily removed therefrom.

A further object of my invention is to provide a storm front as mentioned provided with improved means for securing the same in position.

A further object of my invention is to provide a device of the class under consideration having a front window which may be opened to admit air when desired and which when closed shall be tight and weather proof.

Other objects will appear hereinafter.

With the objects in view my invention consists generally in a frame of fixed size, a window opening therein, extension side portions whereby the device may be adjusted in width to fit vehicles of any size and a suitable covering for said frame and extension portions.

My invention further consists in a substantially vertical frame adapted to be secured at its upper end to the front bow of a vehicle top, and a hinged frame secured to the bottom thereof and adapted to extend forwardly to the dash board.

My invention further consists in the vertical frame and the hinged bottom frame above mentioned and in means for adjusting the length of the latter to fit vehicles of various dimensions.

My invention further consists in a fixed front frame and adjustable bottom frame as mentioned each equipped with adjustable side extensions.

My invention further consists in a storm front of the class mentioned, comprising a front portion adapted to be securely fixed to the top and dash board of the vehicle, in combination extension side curtains and means for preventing the weather from entering between said front and said curtains.

My invention further consists in various details of construction and arrangements of parts all as will be fully described hereinafter and particularly pointed out in the claims.

My invention will be more readily understood by reference to the accompanying drawings forming a part of this specification and in which—

Figure 1 is a side view of a vehicle body and top equipped with a storm front embodying my invention in its preferred form, Fig. 2 is a rear elevation of the adjustable frame of the device, Fig. 3 is a front elevation of the same, Fig. 4 is a horizontal section upon an enlarged scale taken on the line $x$—$x$ of Fig. 2, portion being broken away to illustrate the construction, Fig. 5 is a substantially central vertical longitudinal section through the storm front and the adjacent portions of the vehicle, Fig. 6 is a detail view illustrating the manner of securing the lower ends of the side curtains to the frame, Fig. 7 is a perspective view upon an enlarged scale illustrating the connection between the extension side of the frame and the bottom frame extending to the dash board, Fig. 8 is a perspective view of one corner of the window frame, Fig. 9 is a detail section upon an enlarged scale taken upon the line $y$—$y$ of Fig. 2, Fig. 10 is a similar view taken on the line $z$—$z$ of Fig. 2, Fig. 11 is a perspective view of the members connecting the outer portions of the bottom hinged frame, Fig. 12 is a vertical section on substantially the line $v$—$v$ of Fig. 11, Fig. 13 is a perspective view of the side members illustrated in Fig. 11, and Fig. 14 is a perspective view of the member secured to the bottom portion of the vertical fixed frame.

Referring now to the drawings the main or vertical front frame comprises horizontal top and bottom rails 1 and 2 and vertical side members 3 and 4 which are rigidly secured together in any suitable manner, preferably by mortising the ends of the members 3 and 4 into the members 1 and 2. Fixed to the above mentioned frame is a top piece or board 5 which is secured to the frame by metal straps 6—6, the latter being bent as shown clearly in Fig. 9 to hold the board 5 at a forward inclination corresponding to the angle of the front bow. The board 5 is made adjustable in length in order to fit bows or various widths and to this end comprises a central portion 7 and extension ends 8, the combined length of which is equal to the width of the smallest bows in general use. Secured upon the outer face of the portion 7 and at the ends thereof are metal plates 9. These are co-extensive in width with the board 5 and extend horizontally outwardly to overlap the ends 8. The portions of the plates 9 overlapping the ends 8 are slotted as at 10, and clamping bolts 11 fixed to the ends 8 extend through said slots and are provided upon their outer or forward ends with thumb nuts 12. It is obvious that by this construction the top board 5 may be adjusted to fit bows of any width, and that by providing the plates 9 of a width equal to the width of the members 7 and 8, the weather will be excluded from between said members when extended.

To secure the frame 1—4 and the adjustable top board to the top of the vehicle I provide clamps 13 on the member 7 and clamps 14 on the members 8. These each comprise a metal strip 15 having its end bent at right angles as at 16 and a thumb screw 17 extending through said end. The portion 15 is secured to its respective member 7 or 8 and the end 16 is at a distance from the board 5 sufficient to receive the bow A of the vehicle between them. After the device is placed in position the thumb nuts 17 are tightened clamping the device securely to the front bow, the clamps 13 engaging the top or central portion of the bow and the clamps 14 engaging the ends thereof.

Secured to the outer ends of the members 8 are vertical side rails 18. These extend downwardly in a plane with the frame members 3 and 4 and are secured to the members 8 by metal straps 19 similar to the straps 6. The members 18 are of sufficient length to extend substantially to the bottom of the body B of the vehicle and upon the outside thereof.

Secured to the inner face of the frame member 2 is a metal plate 20. This is preferably co-extensive in width with said member and is provided with projecting ends 21, the entire length of said plate being substantially the same as the distance between the outer ends of the plates 9. Extension members 22 are provided, equal in length to the members 8 and resting against the face of the ends 21. These are provided with bolts 23 extending through slots 24 in the ends 21 and equipped with thumb nuts 25 whereby the members 22 may be secured in extended or adjusted position.

From the foregoing description it should be clear that the vertical portion of the device comprises a frame of fixed size and lateral adjustable extensions whereby the device may be readily and quickly adjusted to fit vehicles of various widths. The plate 20 is provided with upwardly extending portions 26 which are secured to the frame members 3 and 4 and adds strength to the frame.

Hinged to the bottom of the main frame 1—4 is a forwardly projecting frame which extends to the upper edge of the dash board C. This comprises a pair of side members 27 and an outer or end member 28. The inner ends of the members 27 are provided with plates 29 which are hingedly secured as at 30 to the plate 20. By hingedly connecting the frames the bottom frame may rest upon the top of the dash board no matter what the height of the same may be. The members 27 and 28 are connected by an angle frame 31 comprising end portions 32 and a transverse central portion 33. The member 31 is formed of a channel iron to more securely and rigidly hold the members and the member 28 is fixedly secured in the portion 33, whereas the member 31 is slidably mounted upon the ends of the members 27. To this end and to secure the parts in adjusted position, the portions 32 are provided with slots 34 and the members 27 with bolts 35 extending through the same and equipped with thumb nuts 36. By this construction the front frame may be extended to reach the dash board whatever its distance forwardly of the front bow of the top may be.

Adjustably secured to the under face of the portion 33 of the member 31, and at the outer ends thereof are extension bars 37, to the outer ends of which are pivotally connected similar bars 38. Adjustably secured to the members 38 are bars 39 which extend diagonally upwardly, rearwardly and outwardly in a plane with the members 27 to the side bars 18 to which they are hingedly and pivotally connected. This permits adjustment of the bottom hinged frame to fit dash boards of various widths. The member 38 is provided with a longitudinal slot 40 and the member 39 with a bolt 41 extending therethrough whereby the distance between its connection with the bar 18 and the dash board may be regulated. Secured to the front face of the bar 18 is a strap iron 42 to the upper end of which is hingedly connected a plate 43, and pivotally connected to the plate 43 is a plate 44 fixedly secured to the member 39. It is obvious that the member 39 will thus have both a vertical and lateral swing.

Secured to the member 28 or preferably to the adjacent member 31 are clamps 45 for securing the hinged frame to the dash board. Each of the clamps comprises a fixed plate 46 having a threaded extension 47, and a plate 48 slidably mounted thereon. A thumb screw 49 is threaded upon the extension 47 whereby the dash board may be clamped between the plates 46 and 48.

Fitting snugly within the frame 1—4 and hingedly connected to the upper member 1 thereof is a glazed frame or sash 50 which comprises the top and bottom members 51 and 52 respectively, the sides 53 and the glass 54. The bottom member 52 is cut away along a portion of its lower edge forming a slot or aperture 55 through which the reins are adapted to pass, and secured to the outer face of the member 52 above said slot is a flexible flap 56 to prevent the weather from entering through the same. The flap extends below the sash, completely covering the slot 55 and is formed of water proof material such as heavy rubber drill. When desired the sash 50 may be swung inwardly and secured to the top of the cover as shown at 57 in Fig. 5, suitable fastening means being provided for holding the same in raised position.

To hold the glass 54 securely in the frame without the use of putty I provide the inner edges of the sash members 51, 52 and 53 with grooves 58 and make one side 53 removable to facilitate inserting or removing the glass, said side being secured in position by screws 59. By removing said screws the side 53 may be removed for the insertion of the glass.

60 indicates a strip surrounding the sash upon the outside of the frame except for the grooved portion 55. This is secured to the frame members 1—4 and overlaps the sash to form a weather strip and also a stop or jamb for the sash.

The adjustable frame above described is provided with a covering of flexible weather proof material such as heavy rubber drill. This covers the frame with the exception of the window 50 and comprises vertical portions 61 closing the spaces between the fixed frame and the adjacent portions of the bars 18, a trapezoidal portion 62 resting upon the hinged lower frame and an apron extending downwardly from said frame and consisting of a front portion 63 and side portions 64. The inner edges of the portions 61 are securely fixed to the frame members 3 and 4 and their upper ends to the board 5. As the frame is adjustable, and in that it is desirable to keep the covering taut, means must be provided for letting the same out as the frame is broadened and taking the same up as the frame is adjusted to fit a narrow vehicle. To this end buckles 65 are secured to the rails 18 by straps 66, and corresponding straps 67 are secured to the cover at a distance from its outer edges as shown clearly in Fig. 4. The straps 67 are arranged a sufficient distance from the edges to permit the cover to be drawn tight when the frame is in its smallest adjustment, and the edge of the fabric or cover is turned back or folded inwardly as at 68. It is obvious that the inturned portion 68 may be let out as necessary as the frame is broadened. A similar provision is made at the vertical corners or edges of the apron where the portions 63 and 64 meet in order to permit adjustment of the frame and cover to dash boards of various widths, 69 indicating the buckles and 70 the straps arranged at a distance from each other and adapted together with the lower buckles and straps 67 and 68, to keep the apron tight about the dash board. Except when the lower hinged portion of the frame is in fully extended position, a fold 71 is formed at the junction of the parts 63 and 64.

Secured to the rear face of the rails 18 are brackets 72 and 73 in which are mounted spring rollers 74 upon which is wound a curtain 75. The curtain 75 may be drawn back as shown in Figs. 1 and 5 to close the sides of the cover and is preferably provided with a mica or other transparent flexible window 76. The curtain extends inside the cover D of the vehicle at its upper end, and its lower end extends below the upper edge of the body and upon the outside thereof. A suitable fastening 77 is provided for holding the curtain in extended position. The lower bracket 73 is adjustably secured to the rail 18 to permit removal of the curtain roller when desired, as shown in Fig. 6. Secured to the rail 18 adjacent to but outside of the roller 74 is a quarter round strip or bead 78 which closes the space between the roller and the rail to exclude the weather.

Having described my invention what I claim as new and desire to secure by Letters Patent is:

1. In a device of the class described, a frame, a member fixed to the upper end of said frame and comprising a central portion of fixed length and end portions adjustably mounted thereon, vertical members depending from the said end portions and fixed thereto, a frame hingedly connected to the lower end of the first said frame, means for securing the outer end of the last said frame to the dash board, and adjustable members connecting the lower corners of the last said frame and said vertical members, substantially as described.

2. In a device of the class described, a fixed frame and vertical side rails in a plane therewith, in combination with means for adjustably connecting said frame and said rails, a frame hingedly connected to the bottom of the first said frame, said last mentioned frame being adjustable in length, members extending from the outer ends of said hingedly mounted frame and connected to said side rails, said connection being both hinged and pivotal whereby said members may have both vertical and lateral movement, substantially as described.

3. In a device of the class described, a fixed frame and vertical side rails in a plane therewith, in combination with means for adjustably connecting said frame and said rails, a frame hingedly connected to the bottom of the first said frame, extension members on the lower ends of the last said frame and members connecting said extension members and said rails, substantially as described.

4. In a device of the class described, a frame, means for securing the same to the bow of a vehicle, a pair of bars hingedly connected to the lower rail of said frame, an angle member connecting the outer ends of said bars, said member comprising a transverse portion and end portions angularly disposed thereto, and means for adjustably securing said end portions to said bars, substantially as described.

5. In a device of the class described, a frame, a member fixed to the upper end of said frame and provided with means for securing the same to the bow of a vehicle, vertical side rails depending from the ends of the first said member, a pair of bars hingedly connected to the lower rail of said frame, an angle member connecting the outer ends of said bars, said member comprising a transverse portion and end portions angularly disposed thereto, means for adjustably securing said end portions to said bars, means for attaching said transverse portion to a dash board, extension members adjustably secured to the ends of said transverse portion and members connecting said extension members and said side rails, substantially as described.

In testimony whereof I have signed my name to this specification in the presence of two subscribing witnesses.

WILLIAM V. DEAHL.

Witnesses:
C. B. Low,
George M. Daugherty.

---

Copies of this patent may be obtained for five cents each, by addressing the "Commissioner of Patents, Washington, D. C."